(12) United States Patent
Lowney et al.

(10) Patent No.: US 10,412,378 B2
(45) Date of Patent: Sep. 10, 2019

(54) RESONATING OPTICAL WAVEGUIDE USING MULTIPLE DIFFRACTIVE OPTICAL ELEMENTS

(71) Applicant: Microsoft Technology Licensing, LLC, Redmond, WA (US)

(72) Inventors: Joseph Daniel Lowney, Bothell, WA (US); Richard Andrew Wall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/589,478

(22) Filed: May 8, 2017

(65) Prior Publication Data
US 2018/0324402 A1 Nov. 8, 2018

(51) Int. Cl.
*H04N 13/344* (2018.01)
*H04N 13/383* (2018.01)
*G02B 6/00* (2006.01)
*G02B 27/01* (2006.01)

(52) U.S. Cl.
CPC ............ *H04N 13/344* (2018.05); *G02B 6/00* (2013.01); *G02B 27/0172* (2013.01); *H04N 13/383* (2018.05)

(58) Field of Classification Search
USPC ........................................................ 348/62
See application file for complete search history.

(56) References Cited

U.S. PATENT DOCUMENTS

| 5,861,991 A | 1/1999 | Fork |
| 7,580,189 B2 | 8/2009 | Urey et al. |
| 8,160,411 B2 | 4/2012 | Levola et al. |
| (Continued) | | |

FOREIGN PATENT DOCUMENTS

| TW | 200419220 A | 10/2004 |
| WO | 2006064334 A1 | 6/2006 |
| (Continued) | | |

OTHER PUBLICATIONS

Han, et al., "Portable waveguide display system with a large field of view by integrating freeform elements and volume holograms", In Journal of Optics Express, Feb. 4, 2015, 16 pages.
(Continued)

*Primary Examiner* — Behrooz M Senfi
(74) *Attorney, Agent, or Firm* — Holzer Patel Drennan

(57) ABSTRACT

A resonating optical waveguide that increases image intensity and uniformity is provided. The waveguide includes a first diffractive optical element that allows light from an exit pupil of a projector to enter the waveguide and travel in a first direction, and a second diffractive optical element that directs some of the entered light to exit the waveguide to form an expanded pupil. Rather than allow the remaining, non-directed, light to exit at an edge of the waveguide, the optical waveguide further includes a third diffractive optical element that redirects some the remaining light back through the second diffractive optical element in a second direction where it may exit the waveguide as part of the expanded pupil. An additional fourth diffractive optical element may be included to further redirect the light through the second diffractive optical element again.

20 Claims, 6 Drawing Sheets

(56) References Cited

U.S. PATENT DOCUMENTS

| | | |
|---|---|---|
| 8,611,014 B2 | 12/2013 | Valera et al. |
| 2001/0000124 A1 | 4/2001 | Kollin et al. |
| 2003/0173892 A1 | 9/2003 | Terashita |
| 2004/0179128 A1 | 9/2004 | Oikawa |
| 2004/0257664 A1 | 12/2004 | Hashimoto et al. |
| 2007/0159673 A1 | 7/2007 | Freeman et al. |
| 2009/0161191 A1 | 6/2009 | Powell |
| 2010/0079861 A1 | 4/2010 | Powell |
| 2010/0111472 A1 | 5/2010 | Dejong |
| 2011/0013245 A1 | 1/2011 | Tanaka et al. |
| 2011/0044579 A1 | 2/2011 | Travis et al. |
| 2011/0164166 A1 | 7/2011 | Oikawa |
| 2012/0257282 A1 | 10/2012 | Hudman |
| 2013/0188391 A1 | 7/2013 | Futterer |
| 2013/0250431 A1 | 9/2013 | Robbins et al. |
| 2013/0314789 A1 | 11/2013 | Saarikko et al. |
| 2014/0140653 A1 | 5/2014 | Brown et al. |
| 2014/0293434 A1 | 10/2014 | Cheng et al. |
| 2015/0117808 A1 | 4/2015 | Chen et al. |
| 2015/0124317 A1 | 5/2015 | Macnamara |
| 2015/0234101 A1 | 8/2015 | Mercer |
| 2015/0235457 A1 | 8/2015 | Schowengerdt |
| 2015/0241704 A1 | 8/2015 | Schowengerdt et al. |
| 2015/0247975 A1 * | 9/2015 | Abovitz ............. G06K 9/00671 385/37 |
| 2015/0346490 A1 * | 12/2015 | Tekolste ............. G02B 27/0081 349/11 |
| 2017/0034435 A1 * | 2/2017 | Vallius ............... H04N 5/23229 |

FOREIGN PATENT DOCUMENTS

| | | |
|---|---|---|
| WO | 2016020643 A1 | 2/2016 |
| WO | 2017034765 A1 | 3/2017 |

OTHER PUBLICATIONS

"Non-Final Office Action Issued in U.S. Appl. No. 15/607,271", dated Feb. 22, 2018, 7 Pages.

Powell, et al., "Novel Approach to Exit Pupil Expansion for Wearable Displays", International Society for Optics and Photonics of Helmet- and Head-Mounted Displays VII, vol. 4711, Aug. 5, 2002, pp. 235-249.

Yamamoto, "Influence of Light Coherence at the Exit Pupil of the Condenser on the Image Formation", In Optica Acta _ International Journal of Optics, vol. 23, Issue 12, Dec. 1, 1976, 2 Pages.

"International Search Report & Written Opinion Issued in PCT Application No. PCT/US2018/029674", dated Aug. 24, 2018, 13 Pages.

* cited by examiner

RESONATING OPTICAL WAVEGUIDE USING MULTIPLE DIFFRACTIVE OPTICAL ELEMENTS

BACKGROUND

Optical waveguides can be used to expand or replicate the exit pupil of an optical system in one or two dimensions. Typically, light from the exit pupil of the imaging system is received in the waveguide through an in-coupler, and travels through the waveguide in a direction, while some of the light exits a grating structure of the waveguide creating an expanded pupil. The remaining light that does not exit the grating structure is wasted and typically exits or is absorbed at the edges of the waveguide. Current waveguides typically use low-efficiency single pass grating structures to achieve pupil uniformity and field of view uniformity, which results in a large amount of wasted light.

One issue with current waveguides is angular field uniformity. Current systems attempt to achieve a uniform display intensity over the expanded exit pupil and a range of eye reliefs, also referred to as the eye box. The wasted light may result in nonuniform display energy which may be perceived, for example, by the user as either high angular-frequency banding in certain areas of an image displayed in the eye box or as variations in image brightness in different areas of the eye box.

Another issue with such current waveguides is efficiency. Because of the wasted light, devices that use waveguides may compensate by using higher power illumination systems. However, such systems require higher cost components, require large amounts of energy, generate excessive heat, and result in excess stray light.

SUMMARY

A resonating optical waveguide that increases image intensity and uniformity is provided. The waveguide includes a first diffractive optical element that allows light from an exit pupil of a projector to enter the waveguide and travel in a first direction, and a second diffractive optical element that directs some of the entered light to exit the waveguide to form an expanded pupil. Rather than allow the remaining, non-directed, light to exit at an edge of the waveguide, the optical waveguide further includes a third diffractive optical element that redirects some of the remaining light back through the second diffractive optical element in a second direction where it may exit the waveguide as part of the expanded pupil. An additional fourth diffractive optical element may be included to further redirect the light through the second diffractive optical element again.

In an implementation, a resonating optical waveguide is provided. The resonating optical waveguide includes a first end, a second end, a first diffractive optical element, a second diffractive optical element, and a third diffractive optical element. The first diffractive optical element may be configured to allow light to enter into the resonating optical waveguide and cause the light to traverse in a first direction towards the first end. The second diffractive optical element may be configured to receive the light traversing in the first direction from the first diffractive optical element and allow a first portion of the light traversing in the first direction to exit out of the resonating optical waveguide. The third diffractive optical element may be configured to receive a second portion of the light traversing in the first direction from the second diffractive optical element and cause a third portion of the light to traverse in a second direction towards the second end. The second diffractive optical element may be further configured to receive the third portion of the light traversing in the second direction from the third diffractive optical element and allow a fourth portion of the light traversing in the second direction to exit out of the resonating optical waveguide.

Implementations may include some or all of the following features. The resonating optical waveguide may further include a fourth diffractive optical element. The fourth diffractive optical element may be configured to receive a fifth portion of the light traversing in the second direction from the second diffractive optical element and cause a sixth portion of the light to traverse in the first direction towards the first end. The resonating optical waveguide may further include a front surface and a rear surface. The second diffractive optical element configured to allow the first portion of the light traversing in the first direction to exit out of the resonating optical waveguide may include the second diffractive optical element configured to allow the first portion of the light traversing in the first direction to exit out of the resonating optical waveguide through the front or rear surface. The first diffractive optical element may include a coating on one of the front surface or the rear surface. The coating may be a surface-relief diffraction grating or a volume holographic grating. The first diffractive optical element, the second diffractive optical element, and the third diffractive optical element may each have a grating vector, and the grating vector associated with the third diffractive optical element may have a value that is twice a value of the grating vector associated with the first diffractive optical element and a value of the grating vector associated with the second diffractive optical element.

In an implementation, a resonating optical waveguide is provided. The resonating optical waveguide includes a front surface, a rear surface, a first coating on the front surface, a second coating on the front surface, and a third coating on the front surface. The first coating on the front surface allows light to enter the resonating optical waveguide and traverse in a first direction within the resonating optical waveguide. The second coating on the front surface receives the light traversing in the first direction, causes a first portion of the light to exit the resonating optical waveguide through the front or rear surface, and allows a second portion of the light to continue to traverse in the first direction. The third coating on the front surface receives the second portion of the light traversing in the first direction, and causes a third portion of the light to traverse in a second direction within the resonating optical waveguide.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
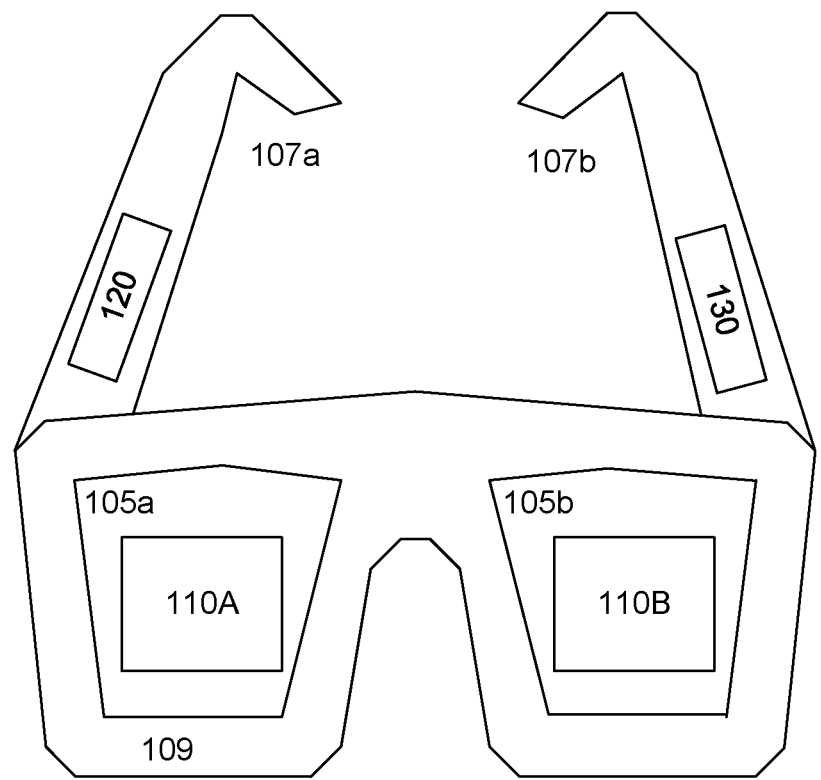
FIG. 1 is an illustration of an exemplary head mounted display device.

FIG. 1 is an illustration of an example head mounted display ("HMD") device 100. In an implementation, the HMD device 100 is a pair of glasses. The HMD device 100 includes lenses 105a and 105b arranged within a frame 109. The frame 109 is connected to a pair of temples 107a and 107b. Arranged between each of the lenses 105 and a wearer's eyes is a near-eye display system 110. The system 110A is arranged in front of a right eye and behind the lens 105A. The system 110B is arranged in front of a left eye and behind the lens 105B. The HMD device 110 also includes a controller 120 and one or more sensors 130. The controller 120 may be a microcomputer operatively coupled to both near-eye display systems 110 and to the sensors 130. Other types of controllers 120 may be used.

Sensors 130 may be arranged in any suitable location on the HMD device 100. They may include a gyroscope or other inertial sensors, a global-positioning system (GPS) receiver, and/or a barometric pressure sensor configured for altimetry. These sensors 130 may provide data on the wearer's location or orientation. From the integrated responses of the sensors 130, the controller 120 may track the movement of the HMD device 100 within the wearer's environment.

In some implementations, sensors 130 may include an eye-tracker that is configured to detect an ocular state of the wearer of the HMD device 100. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used by controller 120 for placement of a computer-generated display image, for example.

In some implementations, each near-eye display system 110 may be at least partly transparent, to provide a substantially unobstructed field of view in which the wearer can directly observe their physical surroundings. Each near-eye display system 110 may be configured to present, in the same field of view, a computer-generated display image.

The controller 120 may control the internal componentry of near-eye display systems 110A and 110B to form the desired display images. In an implementation, the controller 120 may cause near-eye display systems 110A and 110B to display approximately the same image concurrently, so that the wearer's right and left eyes receive the same image at approximately the same time. In other implementations, the near-eye display systems 110A and 110B may project somewhat different images concurrently, so that the wearer perceives a stereoscopic, i.e., three-dimensional, image.

In some implementations, the computer-generated display image and various real images of objects sighted through the near-eye display systems 110 may occupy different focal planes. Accordingly, the wearer observing a real-world object may shift their corneal focus to resolve the display image. In other implementations, the display image and at least one real image may share a common focal plane.

In the HMD device 100, each of the near-eye display systems 110A and 110B may also be configured to acquire video of the surroundings sighted by the wearer. The video may include depth video and may be used to establish the wearer's location, what the wearer sees, etc. The video acquired by each near-eye display system 110 may be received by the controller 120, and the controller 120 may be configured to process the video received. To this end, the HMD device 100 may include a camera. The optical axis of the camera may be aligned parallel to a line of sight of the wearer of the HMD device 100, such that the camera acquires video of the external imagery sighted by the wearer. As the HMD device 100 may include two near-eye display systems—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

No aspect of FIG. 1 is intended to be limiting in any sense, for numerous variants are contemplated as well. In some embodiments, for example, a vision system separate from the HMD device 100 may be used to acquire video of what the wearer sees. In some embodiments, a single near-eye display system 110 extending over both eyes may be used instead of the dual monocular near-eye display systems 110A and 110B shown in FIG. 1.

The HMD device 100 may be used to support a virtual-reality ("VR") or augmented-reality ("AR") environment for one or more participants. A realistic AR experience may be achieved with each AR participant viewing their environment naturally, through passive optics of the HMD device 100. Computer-generated imagery may be projected into the same field of view in which the real-world imagery is received. Imagery from both sources may appear to share the same physical space.

The controller 120 in the HMD device 100 may be configured to run one or more computer programs that support the VR or AR environment. In some implementations, one or more computer programs may run on the controller 120 of the HMD device 100, and others may run on an external computer accessible to the HMD device 100 via one or more wired or wireless communication links. Accordingly, the HMD device 100 may include suitable wireless componentry, such as Wi-Fi.

Figure 2:
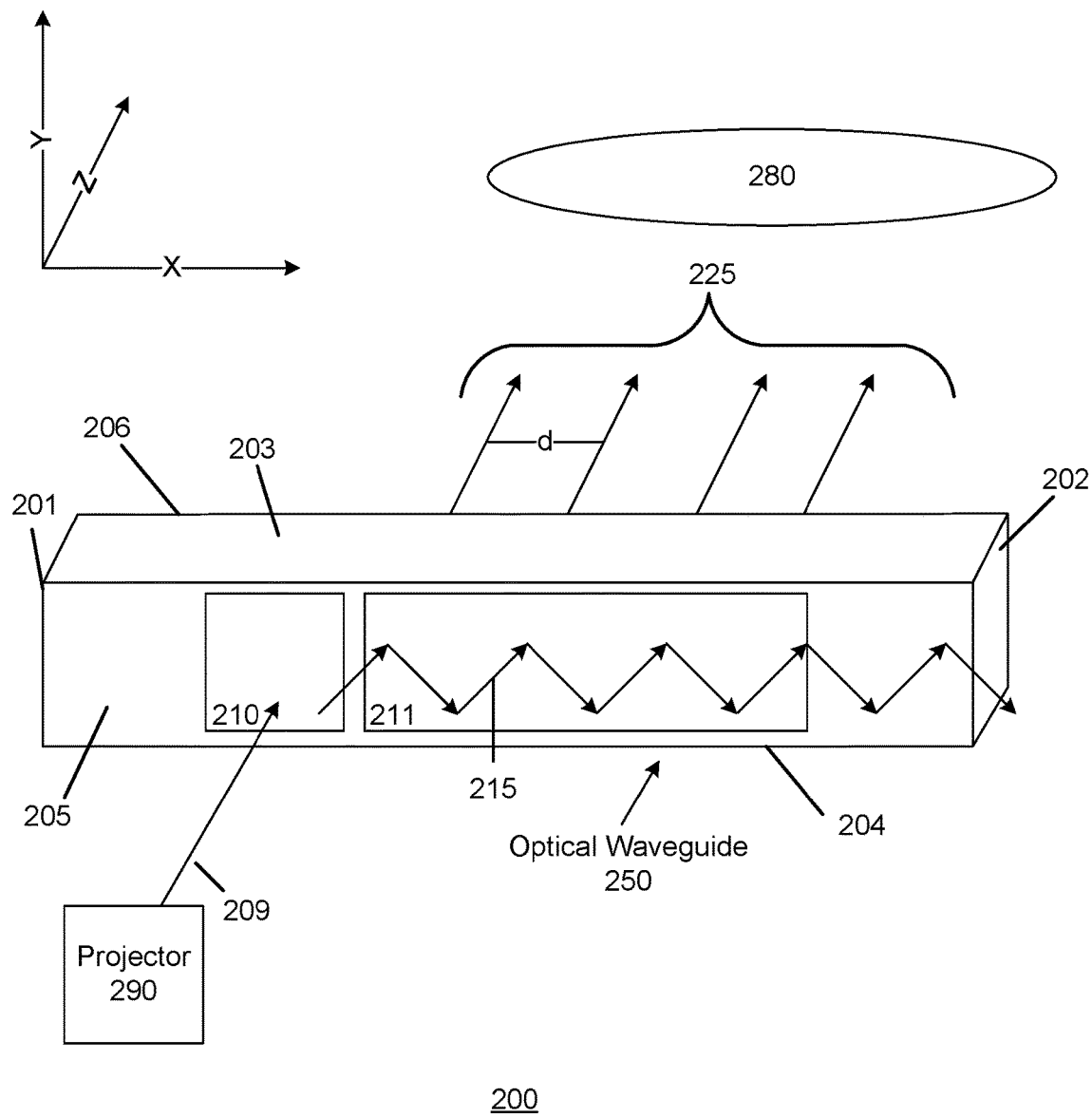
FIG. 2-4 are illustrations of exemplary near-eye display systems.

FIG. 2 is an illustration of an exemplary near-eye display system 200. The near-eye display system 200 may be an implementation of one or both of the near-eye display systems 110 shown in FIG. 1. In the example shown, the system 200 includes a projector 290 and an optical waveguide 250.

The projector 290 may be adapted to form a display image, and to project the display image through an exit pupil of the projector 290. Light corresponding to the display image is shown in the environment 200 as light 209. The projector 290 may be operatively coupled to the controller 120 (not pictured). The controller 120 may provide suitable control signals that, when received by the projector 290, cause the desired display image to be formed.

The optical waveguide 250 may include a plurality of surfaces including a front surface 205, a rear surface 206, a top surface 203, a bottom surface 204, a left-side surface 201, and a right-side surface 202. The optical waveguide 250 may be substantially transparent to light received normal to the front surface 205 in the z direction. Light received normal to the front surface 205 may pass through the front surface 205 and the rear surface 206 to an eye 280 of a wearer of the HMD device 100 that includes the optical waveguide 250. Thus, when the optical waveguide 250 is positioned in front of the eye 280 of the wearer of the HMD device 100, the optical waveguide 250 does not obstruct the ability of the wearer to view external imagery.

The optical waveguide 250 further includes a diffractive optical element 210. The diffractive optical element ("DOE") 210 may receive the light 209 from an exit pupil of the projector 290, and may refract the received light 209 causing a portion of the light 209 to enter the optical waveguide 250 (i.e., in-couple). The portion of the light 209 that enters the optical waveguide 250 is illustrated in the optical waveguide 250 as the light 215 using arrows.

The DOE 210 may cause the light 215 to propagate in the x direction towards the right-side surface 202. In particular, the DOE 210 may cause the light 215 to propagate in the x direction by reflecting off of interior surfaces of the optical waveguide 250. Depending on the implementation, the DOE 210 may be a coating applied to the front surface 205 or rear surface 206 of the optical waveguide 250. An example coating includes a surface-relief diffraction grating ("SRG") or a volume holographic grating ("VHG"). Other types of coatings may be supported.

The optical waveguide 250 may further include a DOE 211. As the light 215 propagates through the optical waveguide 250 and passes through the DOE 211, the DOE 211 may allow at least a portion of the light 215 to exit the optical waveguide 250 (i.e., out-couple) through the rear surface 206 as the light 225. The light 225 may form the eye box, and may be received by the eye 280 of a wearer of the HMD device 100. Like the DOE 201, the DOE 211 may be a coating on the front surface 205 such as an SRG or a VHG. While shown on the front surface 205, the DOE 211 may also be applied to the rear surface 206.

The portion of the light 215 that does not exit the optical waveguide 250 through the rear surface 206 may continue in the x direction towards the right-side surface 202. The light 215 may exit the optical waveguide 250 through the right-side surface 202, or another surface of the optical waveguide 250.

As may be appreciated, the light 225 exiting the optical waveguide 250 through the rear surface 206 is a pupil expansion of the exit pupil of the projector 290. Each arrow representing the light 225 may exit through an exit pupil of the optical waveguide 250. The distance d between the arrows shown in FIG. 2 is referred to as the step. Generally, a large step or distance between exit pupils may result in dark spots or uneven angular field uniformity of the display image in the eye box.

Because the light 215 makes a single pass through the DOE 211, only a portion of the original light 209 may be part of the light 225 that makes up the display image in the eye box. This may result in both a low intensity of the light 225, as well as a large distance d, both of which may result in a poor display experience for the wearer of the HMD device 100.

Figure 3:
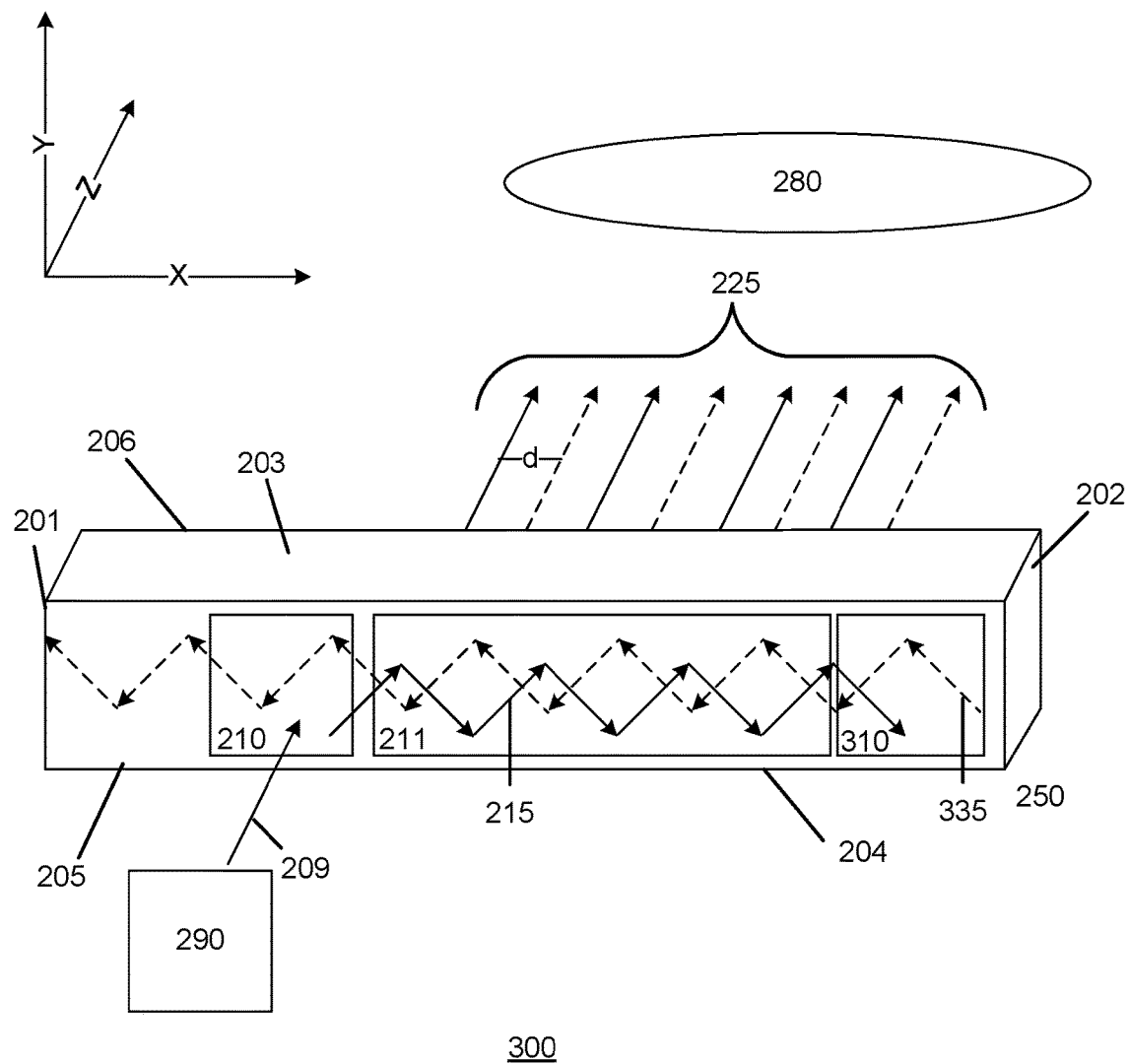

FIG. 3 is an illustration of an exemplary near-eye display system 300. Like the near-eye display system 200, the system 300 includes the projector 290 and the optical waveguide 250.

To reduce the distance d and to increase the intensity of the light 225 received by the eye box, the optical waveguide 250 of the system 300 has been updated to include an additional DOE 310 near the right-side surface 202 that causes a portion of the light 215 to be reflected back through the DOE 211 (i.e., resonate) in a direction that is the opposite of the x direction. The reflected portion of the light 215 is the light 335 and is illustrated in the optical waveguide 250 using a series of hashed arrows. Thus, instead of exiting the optical waveguide 250 at the right-side surface 202, at least a portion of the light 215 makes a second pass through the DOE 211 as the light 335, which may improve both the intensity and the uniformity of the light 225 received at the eye box.

In the example shown, the light 335 may be reflected by the DOE 310. Similar to the DOEs 210 and 211, the DOE 310 may be a coating on the front surface 205 of the optical waveguide 250 such as an SRG or a VHG. However, other types of coatings or structures may be used to reflect the light 335.

Depending in the implementation, the DOE 310 may have a grating vector with a value that is approximately double of a value of a grating vector of the DOE 210 and the DOE 211. Thus, if the DOE 210 has a grating vector with a value of k, then the DOE 310 may have a grating vector with a value of 2(k). Other grating vector values may be supported.

Similar to the light 215, the light 335 is reflected off the internal surfaces of the optical waveguide 250 as it moves through the optical waveguide 250 in a direction that is the opposite of the x direction. As the light 335 passes the DOE 211 a portion of the light 335 exits the rear surface 206 of the optical waveguide 250 as part of the light 225. The portions of the light 335 exiting the rear surface 206 is indicated in the light 225 by the hashed arrows.

The portion of the light 335 that does not exit the optical waveguide 250 through the rear surface 206 may continue in the direction that is the opposite of the x direction towards the left-side surface 201. The remaining light 335 may exit the optical waveguide 250 through the left-side surface 201 or another surface of the optical waveguide 250.

As can be seen in FIG. 3, the use of the DOE 301 has reduced the distance d between each of the exit pupils. As a result, both the intensity and the uniformity of the eye box and the display image may be increased without any change to the intensity or power of the light 209 output by the projector 290.

Figure 4:
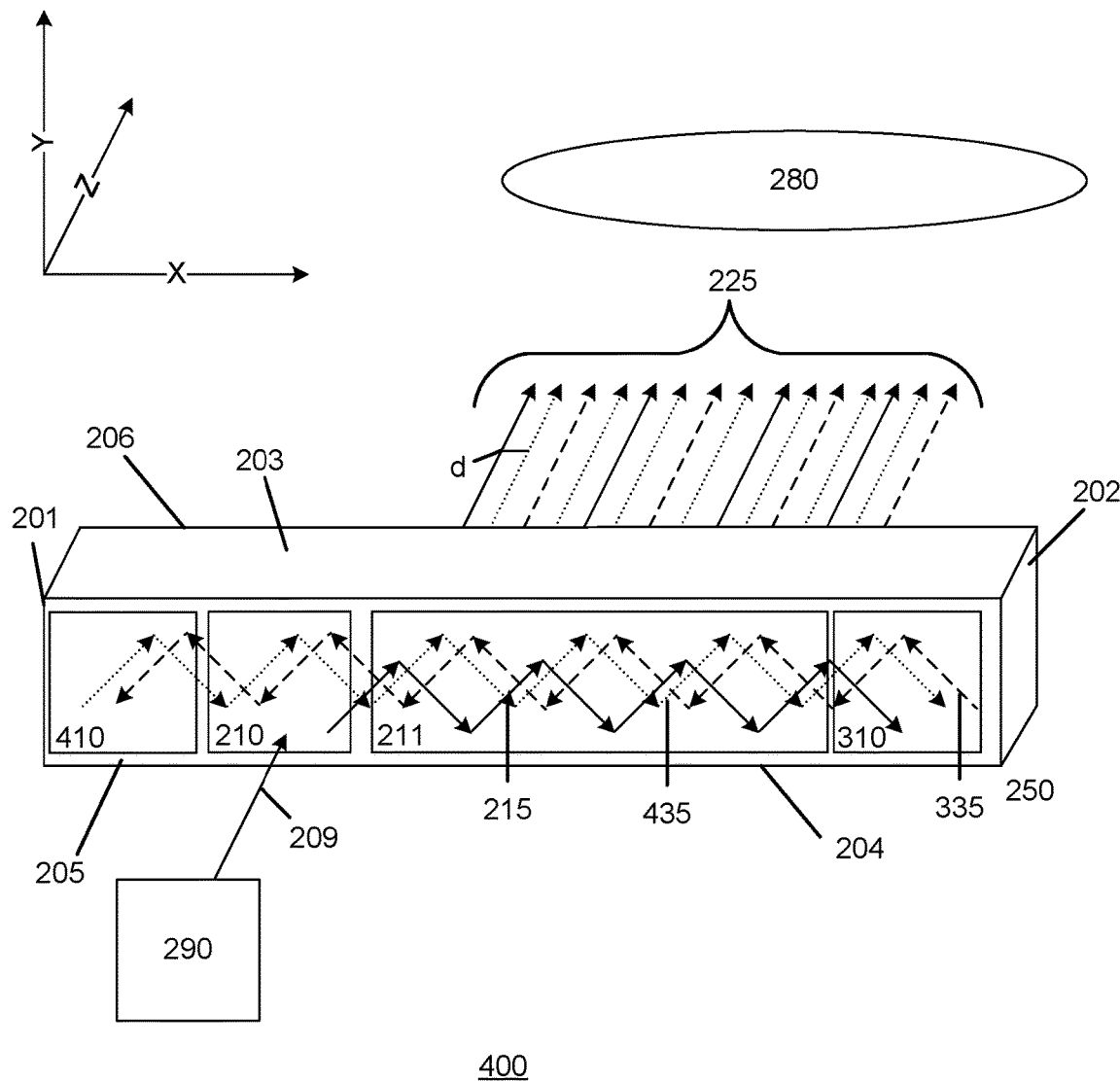

FIG. 4 is an illustration of an exemplary near-eye display system 400. Like the near-eye display systems 200 and 300, the system 400 includes the projector 290 and the optical waveguide 250.

To further reduce the distance d and to further increase the intensity of the light 225 received by the eye box, the optical waveguide 250 has been updated to include an additional DOE 410 near the left-side surface 201 that causes a portion of the light 335 to be reflected back through the DOE 211 in the x direction. The reflected portion of the light 335 is the light 435 and is illustrated in the optical waveguide 250 using a series of dotted arrows.

In the example shown, the light 435 may be reflected by the DOE 410. Similar to the DOEs 210, 211, and 310, the DOE 410 may be a coating on the front surface 205 of the optical waveguide 250 such as an SRG or a VHG. However, other types of coatings or structures may be used to reflect the light 435. Also similar to the DOE 310, the DOE 410 may have a grating vector with a value that is approximately double a value of a grating vector of the DOE 210 and the DOE 211. Other grating vector values may be supported.

Similar to the light 215 and 335, the light 435 is reflected off the internal surfaces of the optical waveguide 250 as it moves through the optical waveguide 250 in the x direction. As the light 435 passes through the DOE 211 a portion of the light 435 exits the rear surface 206 of the optical waveguide 250 as part of the light 225. The portions of the light 435 exiting the rear surface 206 is indicated in the light 225 by the dotted arrows.

As can be seen in FIG. 4, the portion of the light 435 exiting the rear surface 206 has further reduced the distance d between each of the exit pupils. As a result, both the intensity and the uniformity of the eye box and the display image may be further increased. As may be appreciated, any remaining light in the optical waveguide 250 may continue to be reflected back and forth by the DOE 410 and the DOE 310 through the DOE 211. This resonating of the light 209 may result in multiple passes of light through the DOE 211, which may further increase the intensity and uniformity of the eye box and display image.

Figure 5:
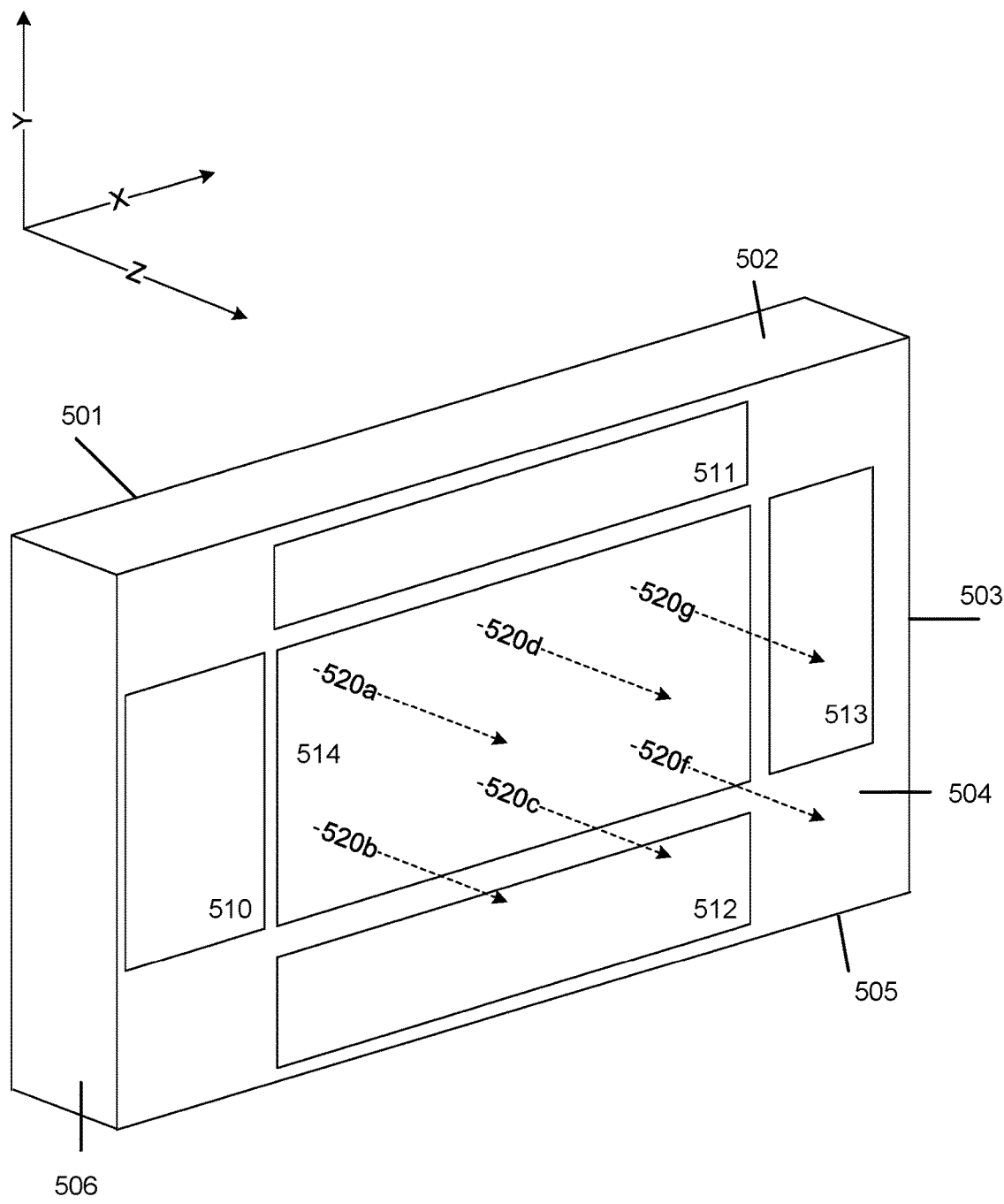
FIG. 5 is an illustration of an exemplary two-dimensional resonating optical waveguide.

For purposes of illustration only, the optical waveguides 250 of FIG. 2-4 are one dimensional. FIG. 5 is an illustration of an exemplary two-dimensional resonating optical waveguide 550. Similar to the optical waveguide 250, the optical waveguide 550 may include a plurality of surfaces including a front surface 501, a rear surface 504, a top surface 502, a bottom surface 505, a left-side surface 503, and a right-side surface 506. Like the optical waveguide 250, the optical waveguide 550 may be substantially transparent to light received normal to the front surface 501.

While not visible in FIG. 5, the optical waveguide 550 may receive light 209 from the projector 290 through one or more DOEs. The DOEs may refract the received light and cause the received light to enter the optical waveguide 550. The received light may propagate through the optical waveguide 550 in the x direction and the y direction.

The optical waveguide 550 may further include a DOE 514 that allows some portion of the received light to exit through the rear surface 504 in the z direction as the light 520 (i.e., the light 520a-f). The light 520 may form the eye box, and may be received by an eye 280 of a wearer of an HMD device 100 that incorporates the optical waveguide 550. The light 520 may exit the rear surface 504 through one or more exit pupils. In the example shown, each arrow of light 520 may correspond to a different exit pupil. The DOE 514 may be a coating on the rear side 504 (or the front side 501) of the optical waveguide 550. The DOE 514 may be an SRG or a VHG, for example.

Like in the optical waveguide 250, only a portion of the light may initially exit the optical waveguide 550 through the DOE 514, and may instead continue traveling through the optical waveguide 550 in the x direction and the y direction. To capture light traveling in the x direction, the optical waveguide 550 may further include a DOE 510 and a DOE 513. The DOE 510 and 513 may be coatings on the rear side 504 (or the front side 501) of the optical waveguide 550.

The DOE 513 may cause light passing through the DOE 514 in the x direction to be reflected back through the DOE 514 in a direction that is opposite to the x direction so that the DOE 514 may allow additional light to exit the optical waveguide with the light 520. The DOE 510 may cause light passing through the DOE 514 in the opposite direction to the x direction to be again reflected through the DOE 514 in the x direction.

To capture light traveling in the y direction, the optical waveguide 550 may further include a DOE 511 and a DOE 512. The DOE 511 and 512 may be coatings on the rear side 504 (or the front side 501) of the optical waveguide 550.

The DOE 511 may cause light passing through the DOE 514 in the y direction to be reflected back through the DOE 514 in a direction that is opposite to the y direction so that the DOE 514 may allow additional light to exit the optical waveguide 550 with the light 520. The DOE 512 may cause light passing through the DOE 514 in the opposite direction to they direction to be again reflected through the DOE 514 in the y direction.

Figure 6:
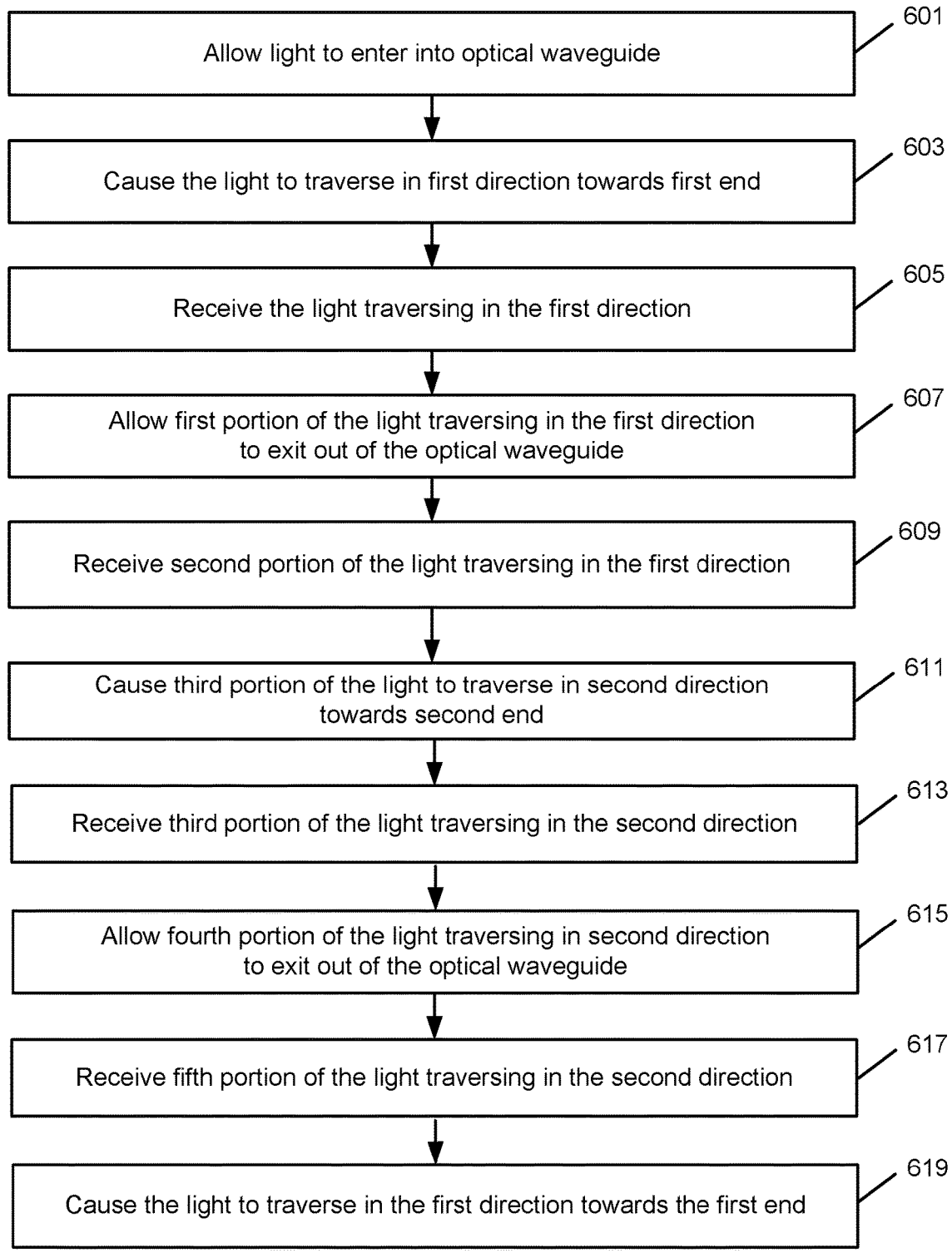
FIG. 6 is an operational flow of an implementation of a method for operating a near-eye display system in a head mounted display device.

FIG. 6 is an operational flow of an implementation of a method 600 for operating a pupil expander in an HMD device 100. The method 600 may be implemented using the optical waveguide 250, for example.

At 601, light is allowed to enter the optical waveguide. The light 209 may be received from an exit pupil of a projector 290 by a DOE 210. The DOE 210 may be a first DOE and may be a coating on the front surface 205 of the optical waveguide 250 that allows light 209 received at a particular angle, or range of angles, to enter the optical waveguide 250. The coating may be an SRG having a surface vector with a value of approximately k, or a VHG. Other surface vectors and coatings may be supported.

At 603, the light is caused to traverse in a first direction towards a first end. The light 215 may be caused to traverse in the first direction by the DOE 210. The light 215 may traverse in the first direction by reflecting off of the internal surfaces of the optical waveguide 250. The first direction may be the x direction and the first end may include the right-side surface 202.

At 605, the light traversing in the first direction is received. The light 215 traversing in the first direction may be received by the DOE 211. The DOE 211 may be the second DOE and may also be a surface coating such as an SRG or a VHG. The DOE 211 may also have a surface vector of k. Depending on the implementation, the DOE 211 may be located on one or both of the front surface 205 or the rear surface 206 of the optical waveguide 250.

At 607, a first portion of the light traversing in the first direction is allowed to exit out of the optical waveguide 250. The first portion may be a portion of the light 215 and may be allowed to exit the optical waveguide 250 by the DOE 211. The portion of the light 215 may exit through one or more exit pupils on the rear surface 206 in the z direction as the light 225. The light 225 may form the eye box and may be received by an eye 280 of a wearer of the HMD device 100. Because the DOE 211 may be a low efficiency DOE, only a portion of the light 215 may be allowed to exit the optical waveguide 250.

At 609, a second portion of the light traversing in the first direction is received. The second portion of light may be a portion of the light 215 that was not allowed to exit the optical waveguide 250 by the DOE 211. The second portion of the light 215 may be received by the DOE 310 of the optical waveguide 250. The DOE 310 may be the third DOE and may be a coating on the front surface 205 of the optical waveguide 250. The coating may have a surface vector with a value of approximately 2(k).

At 611, a third portion of the light is caused to traverse in a second direction towards a second end. The third portion of the light 215 may be the light 335 and may be caused to traverse in the second direction by the DOE 310. The second direction may be an opposite direction to the x direction. The second end may include the left-side surface 201.

At 613, the third portion of the light is received. The light 335 may be received by the DOE 211.

At 615, a fourth portion of the light traversing in the second direction is allowed to exit out of the optical waveguide 250. The fourth portion may be a portion of the light 335 and may be allowed to exit the optical waveguide 250 by the DOE 211. The fourth portion of the light 335 may exit through one or more exit pupils on the rear surface 206 in the z direction as part of the light 225. As may be appreciated, the fourth portion may increase the intensity and uniformity of the light 225 that forms the eye box.

At 617, a fifth portion of the light traversing in the second direction is received. The fifth portion of light may be a portion of the light 335 that was not allowed to exit the optical waveguide 250 by the DOE 211. The fifth portion of the light 211 may be received by the DOE 410 of the optical waveguide 250. The DOE 410 may be the fourth DOE and may be a coating on the front surface 205 of the optical waveguide 250. Like the DOE 335, the coating may have a surface vector with a value of approximately 2(k).

At 619, a sixth portion of the light is caused to traverse in the first direction towards the first end. The sixth portion of the light 335 may be the light 435 and may be caused to traverse in the x direction by the DOE 410. As may be appreciated, the sixth portion of light may again pass through the DOE 211, where some or all of the sixth portion may exit the optical waveguide 250 and further add to the intensity and uniformity of the light 225 that forms the eye box.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a resonating optical waveguide is provided. The resonating optical waveguide includes a first end, a second end, a first diffractive optical element, a second diffractive optical element, and a third diffractive optical element. The first diffractive optical element may be configured to: allow light to enter into the resonating optical waveguide; and cause the light to traverse in a first direction towards the first end. The second diffractive optical element may be configured to: receive the light traversing in the first direction from the first diffractive optical element; and allow a first portion of the light traversing in the first direction to exit out of the resonating optical waveguide. The third diffractive optical element may be configured to: receive a second portion of the light traversing in the first direction from the second diffractive optical element; and cause a third portion of the light to traverse in a second direction towards the second end. The second diffractive optical element may be further configured to: receive the third portion of the light traversing in the second direction from the third diffractive optical element; and allow a fourth portion of the light traversing in the second direction to exit out of the resonating optical waveguide.

Implementations may include some or all of the following features. The resonating optical waveguide may further include a fourth diffractive optical element. The fourth diffractive optical element may be configured to: receive a fifth portion of the light traversing in the second direction from the second diffractive optical element; and cause a sixth portion of the light to traverse in the first direction towards the first end. The resonating optical waveguide may further include a front surface and a rear surface. The second diffractive optical element configured to allow the first portion of the light traversing in the first direction to exit out of the resonating optical waveguide may include the second diffractive optical element configured to allow the first portion of the light traversing in the first direction to exit out of the resonating optical waveguide through the rear surface. The first diffractive optical element may include a coating on one of the front surface or the rear surface. The coating may be a surface-relief diffraction grating or a volume holographic grating. The first diffractive optical element, the second diffractive optical element, and the third diffractive optical element may each have a grating vector, and the grating vector associated with the third diffractive optical element may have a value that is twice a value of the grating vector associated with the first diffractive optical element and a value of the grating vector associated with the second diffractive optical element.

In an implementation, a head mounted display device is provided. The head mounted display device may include a projector, a controller coupled to the projector and configured to cause the projector to project light comprising a display image, and a plurality of resonating optical waveguides. Each resonating optical waveguide may include: a first end, a second end, a first diffractive optical element, a second diffractive optical element, and a third diffractive optical element. The first diffractive optical element may be configured to: allow light to enter into the resonating optical waveguide; and cause the light to traverse in a first direction towards the first end. The second diffractive optical element may be configured to: receive the light traversing in the first direction from the first diffractive optical element; and allow a first portion of the light traversing in the first direction to exit out of the resonating optical waveguide. The third diffractive optical element may be configured to: receive a second portion of the light traversing in the first direction from the second diffractive optical element; and cause a third portion of the light to traverse in a second direction towards the second end. The second diffractive optical element may be further configured to: receive the third portion of the light traversing in the second direction from the third diffractive optical element; and allow a fourth portion of the light traversing in the second direction to exit out of the resonating optical waveguide.

Implementations may include some or all of the following features. Each resonating optical waveguide may further include a fourth diffractive optical element configured to: receive a fifth portion of the light traversing in the second direction from the second diffractive optical element; and cause a sixth portion of the light to traverse in the first direction towards the first end. Each resonating optical waveguide may further include a front surface and a rear surface. The second diffractive optical element of each resonating optical waveguide configured to allow the first portion of the light traversing in the first direction to exit out of the optical waveguide may include the second diffractive optical element of each resonating optical waveguide configured to allow the first portion of the light traversing in the first direction to exit out of the resonating optical waveguide through the rear surface. The first diffractive optical element of each resonating optical waveguide may include a coating on one of the front surface or the rear surface. The coating may be a surface-relief diffraction grating or a volume holographic grating. The first diffractive optical element, the second diffractive optical element, and the third diffractive optical element may each have a grating vector, and the grating vector associated with the third diffractive optical element may have a value that is twice a value of the grating vector associated with the first diffractive optical element and a value of the grating vector associated with the second diffractive optical element.

In an implementation, a resonating optical waveguide is provided. The resonating optical waveguide includes a front surface, a rear surface, a first coating on the front surface, a second coating on the front surface, and a third coating on the front surface. The first coating on the front surface allows light to enter the resonating optical waveguide and traverse in a first direction within the resonating optical waveguide. The second coating on the front surface receives the light traversing in the first direction, causes a first portion of the light to exit the resonating optical waveguide through the rear surface, and allows a second portion of the light to continue to traverse in the first direction. The third coating on the front surface receives the second portion of the light traversing in the first direction, and causes a third portion of the light to traverse in a second direction within the resonating optical waveguide.

Implementations may include some or all of the following features. The first direction and the second direction may be opposite directions. The second coating may further receive the third portion of the light, and allow a fourth portion of the light to exit the resonating optical waveguide through the rear surface. The first coating and the third coating may be surface-relief diffraction gratings or volume holographic gratings. The third coating may have a grating vector that has a value that is twice a value of a grating vector of the first coating.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A resonating optical waveguide having a first end, a second end, a first surface, and a second surface, the resonating optical waveguide comprising:
   a first diffractive optical element positioned between the first end and the second end and configured to:
     allow light to enter through the first surface into the resonating optical waveguide; and
     cause the light to traverse in a first direction from the first diffractive optical element towards the first end;
   a second diffractive optical element positioned between the first diffractive optical element and the second end and configured to:
     receive the light traversing in the first direction from the first diffractive optical element; and
     allow a first portion of the light traversing in the first direction to exit out of the resonating optical waveguide via the second surface; and
   a third diffractive optical element positioned between the second diffractive optical element and the second end and configured to:
     receive a second portion of the light traversing in the first direction from the second diffractive optical element; and
     cause a third portion of the light to traverse in a second direction towards the second end, wherein the second diffractive optical element is further configured to:
       receive the third portion of the light traversing in the second direction from the third diffractive optical element; and
       allow a fourth portion of the light traversing in the second direction to exit out of the resonating optical waveguide via the second surface.

2. The resonating optical waveguide of claim 1, further comprising a fourth diffractive optical element configured to:
   receive a fifth portion of the light traversing in the second direction from the second diffractive optical element; and
   cause a sixth portion of the light to traverse in the first direction towards the first end.

3. The resonating optical waveguide of claim 1, wherein the resonating optical waveguide further comprises a front surface and a rear surface.

4. The resonating optical waveguide of claim 3, wherein the second diffractive optical element configured to allow the first portion of the light traversing in the first direction to exit out of the resonating optical waveguide comprises the second diffractive optical element configured to allow the first portion of the light traversing in the first direction to exit out of the resonating optical waveguide through the rear surface.

5. The resonating optical waveguide of claim 3, wherein the first diffractive optical element comprises a coating on one of the front surface or the rear surface.

6. The resonating optical waveguide of claim 5, wherein the coating is a surface-relief diffraction grating or a volume holographic grating.

7. The resonating optical waveguide of claim 1, wherein the first direction and the second direction are opposite directions.

8. The resonating optical waveguide of claim 1, wherein the first diffractive optical element, the second diffractive optical element, and the third diffractive optical element each have a grating vector, and the grating vector associated with the third diffractive optical element has a value that is twice a value of the grating vector associated with the first diffractive optical element and a value of the grating vector associated with the second diffractive optical element.

9. A head mounted display device comprising:
   a projector;
   a controller coupled to the projector and configured to cause the projector to project light comprising a display image; and
   a plurality of resonating optical waveguides, wherein each resonating optical waveguide comprises:
     a first end;
     a second end;
     a first surface and a second surface between the first end and the second end;
     a first diffractive optical element positioned between the first end and second end configured to:
       allow the light to enter through the first surface into the resonating optical waveguide; and
       cause the light to traverse in a first direction from the first diffractive optical element towards the first end;
     a second diffractive optical element positioned between the first diffractive optical element and the second end and configured to:
       receive the light traversing in the first direction from the first diffractive optical element; and allow a first portion of the light traversing in the first direction to exit out of the resonating optical waveguide via the second surface; and a third diffractive optical element positioned between the second diffractive optical element and the second end and configured to:

receive a second portion of the light traversing in the first direction from the second diffractive optical element; and cause a third portion of the light to traverse in a second direction towards the second end, wherein the second diffractive optical element is further configured to:

receive the third portion of the light traversing in the second direction from the third diffractive optical element; and allow a fourth portion of the light traversing in the second direction to exit out of the resonating optical waveguide via the second surface.

10. The head mounted display device of claim 9, wherein each resonating optical waveguide further comprises a fourth diffractive optical element configured to:

receive a fifth portion of the light traversing in the second direction from the second diffractive optical element; and cause a sixth portion of the light to traverse in the first direction towards the first end.

11. The head mounted display device of claim 9, wherein the first surface of each resonating optical waveguide further comprises a front surface and the second surface of each resonating optical waveguide further comprises a rear surface.

12. The head mounted display device of claim 9, wherein the second diffractive optical element of each resonating optical waveguide configured to allow the first portion of the light traversing in the first direction to exit out of the resonating optical waveguide comprises the second diffractive optical element of each resonating optical waveguide configured to allow the first portion of the light traversing in the first direction to exit out of the resonating optical waveguide through the rear surface.

13. The head mounted display device of claim 9, wherein the first diffractive optical element of each resonating optical waveguide comprises a coating on one of the front surface or the rear surface.

14. The head mounted display device of claim 13, wherein the coating is a surface-relief diffraction grating or a volume holographic grating.

15. The head mounted display device of claim 9, wherein the first diffractive optical element, the second diffractive optical element, and the third diffractive optical element each have a grating vector, and the grating vector associated with the third diffractive optical element has a value that is twice a value of the grating vector associated with the first diffractive optical element and a value of the grating vector associated with the second diffractive optical element.

16. A resonating optical waveguide including a first and a second end, the resonating optical waveguide comprising:

a front surface positioned between the first end and the second end and a rear surface positioned between the first end and the second end;

a first coating on the front surface that allows light to enter the resonating optical waveguide through the front surface and traverse in a first direction within the resonating optical waveguide from the first coating toward the first end;

a second coating positioned between the first coating and the second end on the front surface that receives the light traversing in the first direction, causes a first portion of the light to exit the resonating optical waveguide through the rear surface, and allows a second portion of the light to continue to traverse in the first direction; and a third coating positioned between the second coating and the second end on the front surface that receives the second portion of the light traversing in the first direction, and causes a third portion of the light to traverse in a second direction within the resonating optical waveguide.

17. The resonating optical waveguide of claim 16, wherein the first direction and the second direction are opposite directions.

18. The resonating optical waveguide of claim 16, wherein the second coating further receives the third portion of the light, and allows a fourth portion of the light to exit the resonating optical waveguide through the rear surface.

19. The resonating optical waveguide of claim 16, wherein the first coating and the third coating are surface-relief diffraction gratings or volume holographic gratings.

20. The resonating optical waveguide of claim 16, wherein the third coating has a grating vector that has a value that is twice a value of a grating vector of the first coating.

* * * * *